United States Patent
Broz et al.

(10) Patent No.: US 9,729,438 B2
(45) Date of Patent: Aug. 8, 2017

(54) CLOUD-BASED ANONYMOUS ROUTING

(71) Applicant: International Business Machines Corporation, Armonk, NY (US)

(72) Inventors: Michal Broz, Austin, TX (US); Steven D. Clay, Round Rock, TX (US); Federico A. Galarraga, Austin, TX (US); Eduardo N. Spring, Round Rock, TX (US); Michael C. Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 14/314,100

(22) Filed: Jun. 25, 2014

(65) Prior Publication Data
US 2015/0381487 A1    Dec. 31, 2015

(51) Int. Cl.
*H04L 12/741* (2013.01)
*H04L 29/06* (2006.01)
*H04L 12/725* (2013.01)

(52) U.S. Cl.
CPC ............ *H04L 45/74* (2013.01); *H04L 45/306* (2013.01); *H04L 63/0414* (2013.01); *H04L 63/0471* (2013.01)

(58) Field of Classification Search
CPC .................................................. H04L 63/0428
See application file for complete search history.

(56) References Cited

U.S. PATENT DOCUMENTS

| | | | |
|---|---|---|---|
| 2009/0034738 A1* | 2/2009 | Starrett | H04L 63/162 380/278 |
| 2010/0125903 A1 | 5/2010 | Devarajan et al. | |
| 2011/0103394 A1* | 5/2011 | Vogt | H04L 29/12367 370/401 |
| 2012/0166582 A1* | 6/2012 | Binder | H04L 63/18 709/217 |

(Continued)

OTHER PUBLICATIONS

Google, "About Google Ads", 3 pages. https://support.google.com/ads/answer/1634057?hl=en © 2014 Google.

(Continued)

*Primary Examiner* — Kambiz Zand
*Assistant Examiner* — Thanh Le
(74) *Attorney, Agent, or Firm* — Jay Wahlquist (57) ABSTRACT

A system and computer-implemented method for cloud-based anonymous traffic routing is disclosed. The method may include receiving, from a client application by a router, network traffic identified for a destination. The method may include determining, for a set of internal cloud nodes distinct from both the client application and the destination, a set of internet protocol (IP) addresses including a first IP address for a first internal cloud node of the set of internal cloud nodes. The method may also include establishing an anonymity algorithm for cloud-based anonymous traffic routing, the anonymity algorithm configured to use the set of IP addresses. The method may also include routing, based on the anonymity algorithm, the network traffic to the first internal cloud node using the first IP address. The method may also include routing the network traffic from the set of internal cloud nodes to the destination identified by the client application.

14 Claims, 7 Drawing Sheets

(56) References Cited

U.S. PATENT DOCUMENTS

2014/0126418 A1* 5/2014 Brendel ............. H04L 12/4641
370/254

OTHER PUBLICATIONS

Google, "About Ads Settings", 2 pages. https://support.google.com/ads/answer/2662856?hl=en&ref_topic=2971788 © 2014 Google.
Google, "Choose an ad format", 4 pages. https://support.google.com/adwords/answer/1722124?hl=en © 2014 Google.
Jones, N., et al., "Hiding Amongst the Clouds: A Proposal for Cloud-based Onion Routing", Princeton University. 6 pages.
Mell, P., et al., "The NIST Definition of Cloud Computing", Recommendations of the National Institute of Standards and Technology. Special Publication 800-145. Computer Security Division Information Technology Labratory, Sep. 2011. 7 pages.

* cited by examiner

CLOUD-BASED ANONYMOUS ROUTING

BACKGROUND

The present disclosure relates to computer systems, and more specifically, to cloud-based anonymous traffic routing.

In modern network communications systems network traffic between parties is routed from the source to the destination via a series of addressable nodes included in the network. Both the source and destination address are typically viewable by all nodes in the network as the network traffic traverses the path. In addition, both the contents of the message and identity of the parties under certain circumstances could be determined by eavesdropping on the network. Different methods for providing confidentiality can be used to protect the network traffic.

SUMMARY

Aspects of the present disclosure, in certain embodiments, are directed a system and method for anonymous traffic routing in a cloud environment. In certain embodiments, the method may include receiving, from a client application by a router, network traffic identified for a destination. In certain embodiments, the method may include determining, for a set of internal cloud nodes distinct from both the client application and the destination, a set of internet protocol (IP) addresses including a first IP address for a first internal cloud node of the set of internal cloud nodes. In certain embodiments, the method may include establishing an anonymity algorithm for cloud-based anonymous traffic routing. The anonymity algorithm may be configured to use the set of IP addresses. In certain embodiments, the method may include routing, based on the anonymity algorithm, the network traffic to the first internal cloud node using the first IP address. In certain embodiments, the method may include routing the network traffic from the set of internal cloud nodes to the destination identified by the client application.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for cloud-based anonymous traffic routing. More particular aspects relate to using an anonymity algorithm to route network traffic utilizing a set of internal cloud nodes. The method may include receiving, from a client application by a router, network traffic identified for a destination. The method may also include determining a set of internet protocol (IP) addresses for a set of internal cloud nodes. The method may also include routing, based on an anonymity algorithm utilizing the set of IP addresses, using the router, the network traffic to a first internal cloud node of the set of internal cloud nodes using a first IP address of the set of IP addresses. The method may also include routing the network traffic to a destination identified by the client application.

As the use of cloud-computing services and cloud-computing environments grows more prevalent, maintaining security of the network traffic that passes through the cloud is an important consideration. For entities or individuals who manage multiple computing nodes in a cloud environment, having traffic between these VMs intercepted by unauthorized parties can pose challenges associated with maintaining data confidentiality and network security. Accordingly, aspects of the present disclosure, in certain embodiments, are directed toward a method and system for anonymizing (e.g., obfuscating) the network traffic between computing nodes within a cloud environment, such that another party cannot determine the computing nodes between which the network traffic was routed. Aspects of the present disclosure may provide benefits associated with efficiency, data confidentiality, and network security.

While methods of anonymous traffic routing have been utilized previously in other computing environments, implementing anonymous traffic routing in a cloud environment, as described in the present disclosure, poses significant challenges. For example, the issues of data security and privacy are two areas that can be improved upon within the context of cloud computing, and bear consideration. Within a cloud environment, services are often outsourced to external entities, making it more difficult to maintain data integrity and privacy, as well as support data and service ability. As examples, sensitive information like personal financial records and healthcare information need to be maintained securely to protect the well-being of clients and patients. Accordingly, by leveraging the techniques of the present disclosure described herein, such as using an anonymity algorithm to direct network traffic in the cloud through an anonymous network of internal cloud nodes, sensitive data can be managed more confidentially and securely. Additionally, in certain embodiments, the anonymity algorithm can be configured to direct the network traffic to internal node nodes that are handling a great deal of network traffic. Such a technique may provide benefits associated with concealing the network traffic from a potential network attack.

An additional challenge associated with implementing the disclosed method of anonymous traffic routing in a cloud environment is the issue of providing the anonymous traffic-routing service while using minimal network bandwidth.

Many cloud applications are bandwidth intensive, and for the anonymous traffic routing method of the present disclosure to cooperate unobtrusively with the bandwidth needs of other cloud applications, it was desirable to minimize the bandwidth utilized. Accordingly, aspects of the present disclosure are directed toward directing the network traffic to internal cloud nodes based on the workload level of each node (e.g., directing the network traffic to nodes handling low levels of network traffic), and in this way avoid network congestion and ease bandwidth requirements. Additional aspects of the present disclosure are directed toward allowing a user to select from a set of anonymity preferences to specify the level of anonymity desired for a particular network request, which can also help to reduce bandwidth usage.

Aspects of the present disclosure relate to various embodiments of a system and method for cloud-based anonymous traffic routing. More particular aspects relate to routing network traffic to a first internal cloud node using an anonymity algorithm. The method and system may work on a number of devices and operating systems. Aspects of the present disclosure include receiving, from a client application by a router, network traffic identified for a destination. In certain embodiments, the router may be a hardware router or a software router.

Aspects of the present disclosure, in certain embodiments, are directed toward determining a set of internet protocol (IP) addresses for a set of internal cloud nodes. The set of IP addresses can include a first IP address for a first internal cloud node of the set of internal cloud nodes. In certain embodiments, the client application may be active on a virtual machine of an internal cloud node of the set of cloud nodes. In certain embodiments, the internal cloud nodes may include onion-routing nodes.

Aspects of the present disclosure, in certain embodiments, are directed toward establishing an anonymity algorithm for cloud-based traffic routing. In certain embodiments, the anonymity algorithm may be configured to use the set of IP addresses. In certain embodiments, the anonymity algorithm may be configured to randomly assign an IP address of the set of IP addresses to an internal cloud node of the set of cloud nodes. In certain embodiments, the anonymity algorithm may be configured to assign a temporal validity value to an IP address of the set of IP addresses.

Aspects of the present disclosure, in certain embodiments, are directed toward routing, using the router, the network traffic to a first internal cloud node of the set of internal cloud nodes using a first IP address of the set of IP addresses. In certain embodiments, the routing may be based on an anonymity algorithm utilizing the set of IP addresses. In certain embodiments, the router may be configured to route the network traffic to a second internal cloud node of the set of internal cloud nodes using a second IP address of the set of IP addresses. Routing the network traffic to the second internal cloud node may be based on the anonymity algorithm.

Aspects of the present disclosure, in certain embodiments, are directed toward routing the network traffic from the set of internal cloud nodes to the destination identified by the client application. In certain embodiments, the method may include providing a cloud interface configured to manage a set of anonymity preferences of the router. For example in certain embodiments, the anonymity preferences may include destination anonymity, client application anonymity, and virtual machine anonymity.

It is understood in advance that although this disclosure includes a detailed description on cloud computing, implementation of the teachings recited herein are not limited to a cloud computing environment. Rather, embodiments of the present invention are capable of being implemented in conjunction with any other type of general purpose or specialized computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models may include:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are may include:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
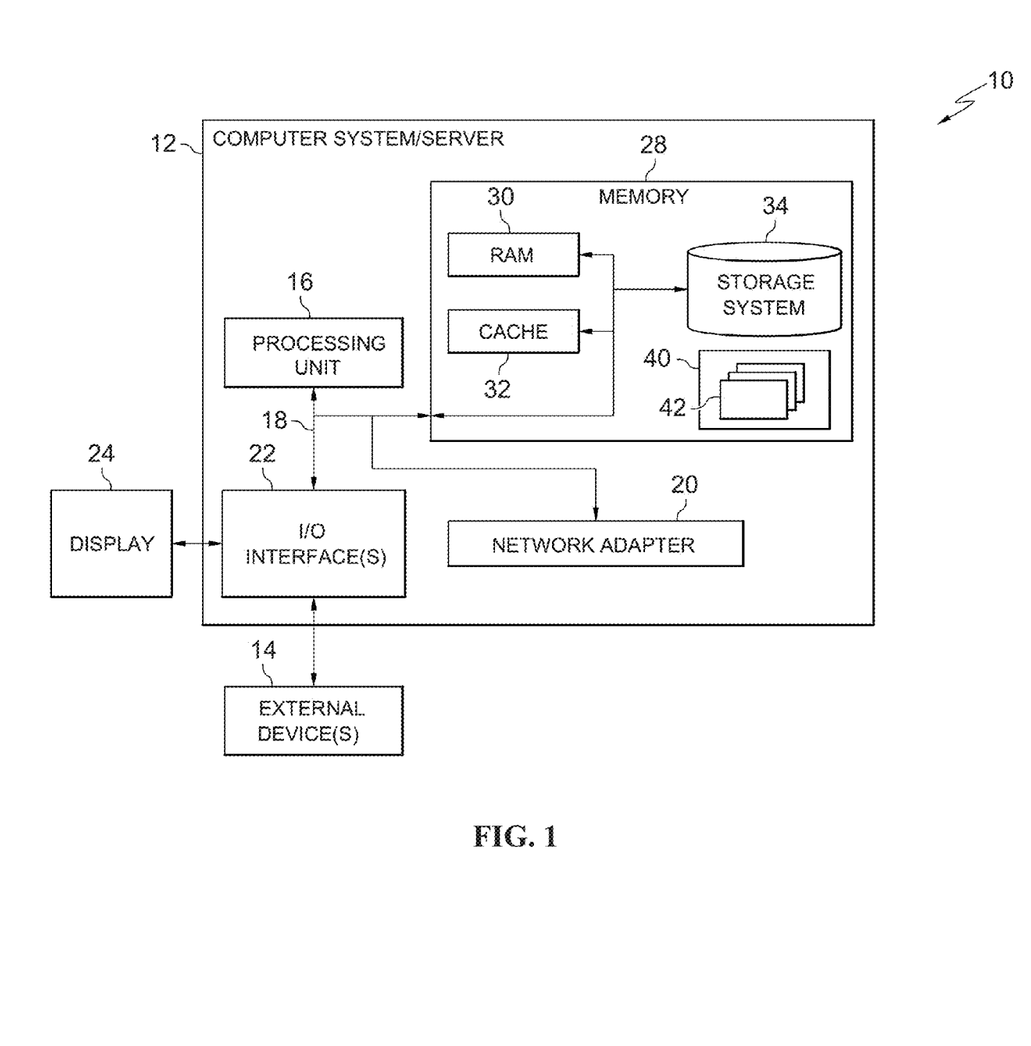
FIG. 1 depicts a cloud computing node according to embodiments.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
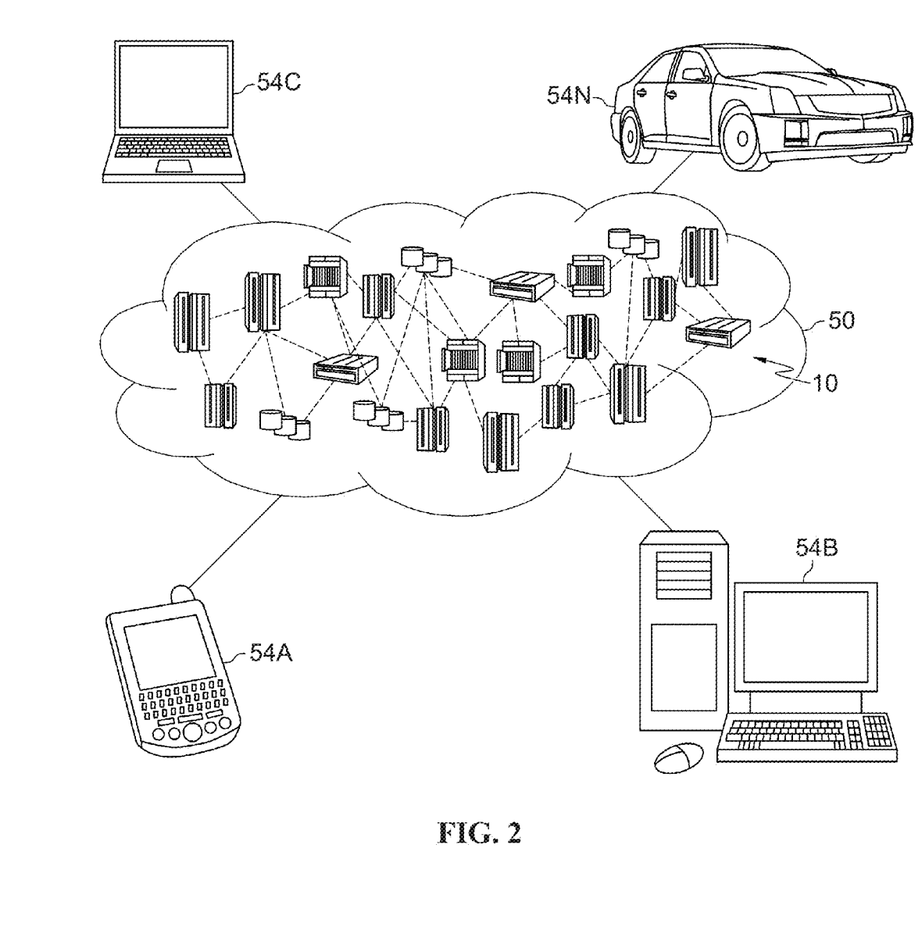
FIG. 2 depicts a cloud computing environment according to embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
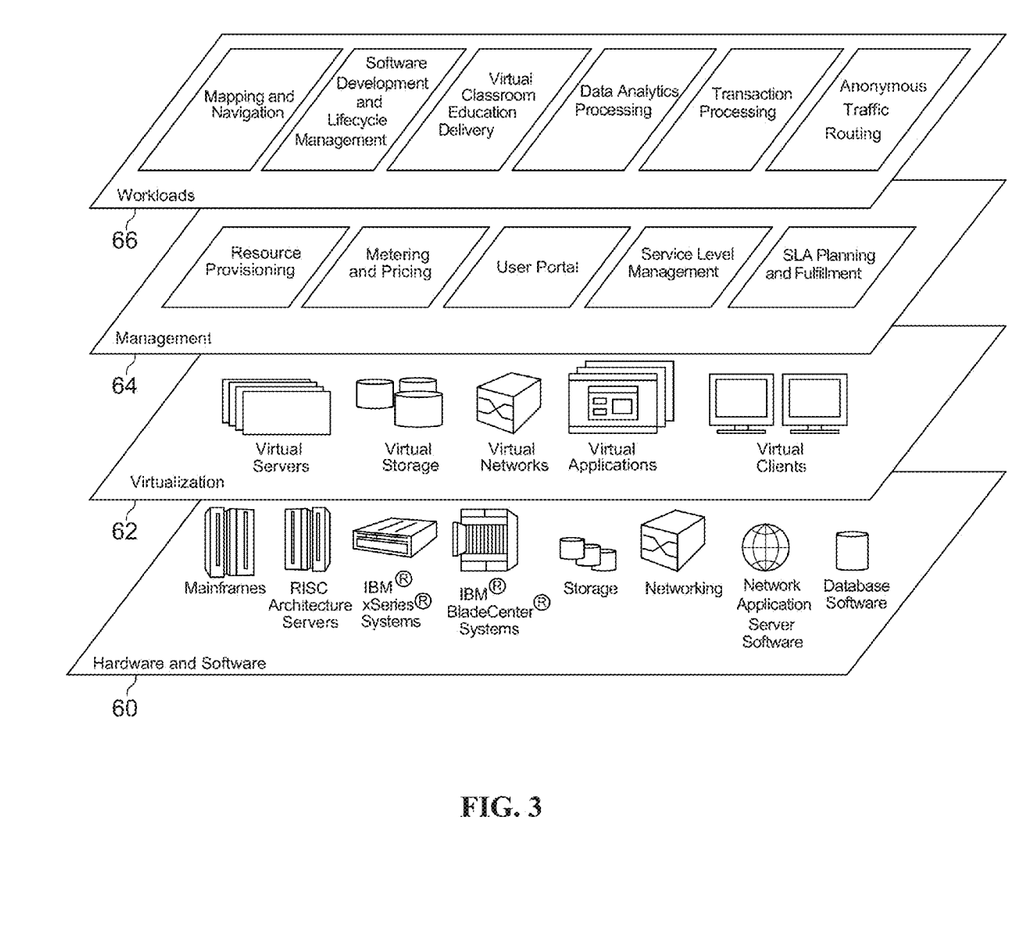
FIG. 3 depicts abstraction model layers according embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and anonymous traffic routing.

Figure 4:
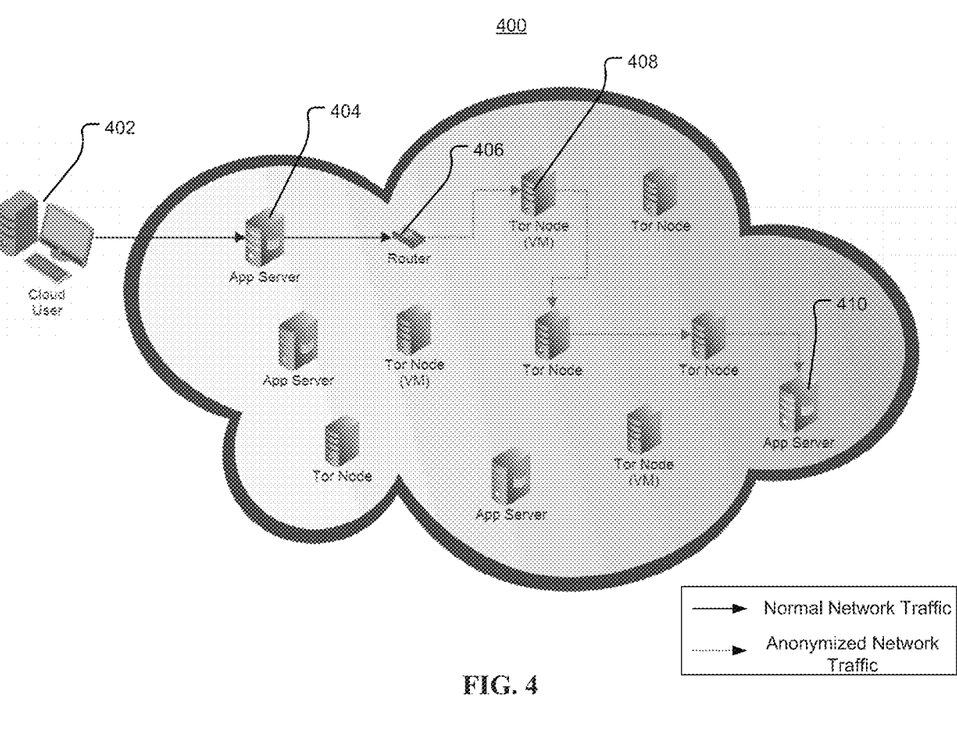
FIG. 4 depicts a cloud environment for anonymous traffic routing, according to embodiments.

FIG. 4 depicts a cloud environment 400 for anonymous traffic routing, consistent with embodiments of the present disclosure. As shown in FIG. 4, the cloud environment 400 may include a cloud user 402, one or more application (app) servers such as application server 404, a router 406, and one or more Tor nodes such as Tor node 408. In certain embodiments, an app server may serve as a destination 410.

Consistent with various embodiments, the cloud user 402 may, in certain embodiments, utilize an application on a workstation that is configured to direct network traffic to another location in the cloud environment 400. The network traffic may include data or information encapsulated in a series of data packets. As an example, in certain embodiments, the cloud user 402 may use an email application to send an email. In certain embodiments, the email may be intended for destination 410. Accordingly, consistent with embodiments of the present disclosure, the cloud environment 400 can facilitate anonymization (e.g., obfuscation) of the network traffic of the cloud user 402. In certain embodiments, the app server 404 may be configured to act as a "gateway" or an entry point of the network traffic into the cloud environment 400. That is, the app server 404 may receive the network traffic from the cloud user 402, and determine whether the network traffic is to be anonymized (e.g., obfuscated), or to be sent directly to its intended destination. In certain embodiments, the router 406 can determine whether to anonymize the network traffic based on the origin and intended destination of the network traffic.

Consistent with various embodiments, network traffic that is designated for anonymization can be sent to the router 406. In certain embodiments, the router 406 can be a hardware router. In certain embodiments, the router 406 can be a software router. The router 406 can be configured to receive the network traffic designated for anonymization from the app server 404, and direct the network traffic through one or more internal cloud nodes. In certain embodiments, the internal cloud nodes can be Tor (The Onion Router) nodes. For example, the router may direct the network traffic through Tor node 408, as well as other subsequent Tor nodes in the cloud environment 400. In certain embodiments, after being routed through one or more Tor nodes, the network traffic can arrive at the destination 410.

Figure 5:
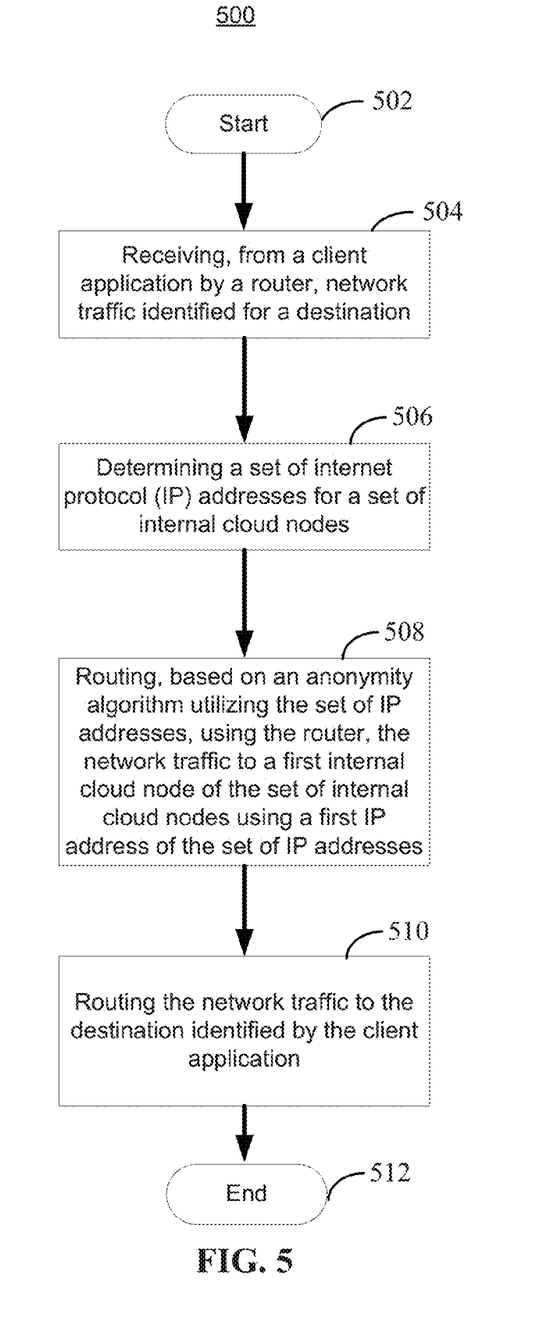
FIG. 5 is a flowchart illustrating a method for anonymizing network traffic in a cloud, according to embodiments.

FIG. 5 is a flowchart illustrating a method 500 for anonymizing network traffic in a cloud, consistent with embodiments of the present disclosure. Aspects of FIG. 5 are directed toward utilizing a router and an anonymity algorithm to route network traffic to a destination through one or more internal cloud nodes. The method 500 may begin at block 502 and end at block 512. Consistent with various embodiments, the method 500 can include a receiving block 504, a determining block 506, a first routing block 508, and a second routing block 510.

Consistent with various embodiments, at block 504 the method 500 may include receiving, from a client application by a router, network traffic identified for a destination. The client application may be a software program, widget, utility, or other application. In certain embodiments, the client application may be active on a computer workstation. In certain embodiments, the computer workstation may be communicatively connected to a cloud environment (e.g., cloud environment 400 of FIG. 4). Further, the client application may be active on the computer workstation, and be configured to send and receive network traffic with one or more nodes (servers, computers, etc.) of the cloud environment. In certain embodiments, the client application may transmit network traffic (e.g., data packets) designated for a destination to a node of the cloud environment. For example, the network traffic may be an email, and the intended destination is a particular IP (internet protocol) address of a device of the cloud environment.

In certain embodiments, the network traffic may be received from the client application by a router. In certain embodiments, the router may be a hardware router. For example, the router may be a physical device configured to receive the network traffic and data packets from the client application, determine the intended destination of the network traffic, and direct the network traffic to another location in the cloud environment based on a routing policy. In certain embodiments, the router may be a software router. For example, the router may be a software application active on a node of the cloud environment that is configured to manage the network traffic.

Consistent with various embodiments, at block 506 the method 500 may include determining a set of internet protocol (IP) addresses for a set of internal cloud nodes. In certain embodiments, the set of IP addresses may be determined by an anonymity algorithm configured to assign random IP addresses to each node of the set of internal cloud nodes. Further, in certain embodiments, the anonymity algorithm may be configured to assign a temporal validity value to each IP address. The temporal validity value may specify a period of time over which the IP address is valid (e.g., 6 hours, 3 days, 1 week, etc.). Accordingly, the anonymity algorithm may be configured to reassign IP addresses or temporal validity values at certain time intervals, or when a particular temporal validity value expires.

The set of internal cloud nodes may include application servers, computer workstations, mobile devices, and Tor (The Onion Router) nodes. The Tor nodes may be configured to encrypt (e.g., wrap) data packets in multiple layers of encryption to obfuscate the final destination IP address, and relay the encrypted packets to other TOR nodes. Each successive TOR node may be configured to decrypt (e.g., unwrap) a layer of encryption to reveal the next destination. When the final layer of encryption is removed, the data packets can be sent to the final destination IP address, without revealing the original source IP address. As the data packets are at least partially concealed at each point in the process, no single point will reveal the source and destination of the encrypted data packets. Other internal cloud nodes other than Tor nodes are also contemplated.

Consistent with various embodiments, at block 508 the method 500 may include routing, based on an anonymity algorithm utilizing the set of IP addresses, using the router, the network traffic to a first internal cloud node of the set of internal cloud nodes using a first IP address of the set of IP addresses. In certain embodiments, the anonymity algorithm may be configured to randomly assign an IP address of the set of IP addresses (e.g., the IP addresses determined at block 506 of the method 500) to an internal cloud node of the set of internal cloud nodes (e.g., Tor nodes). As described herein, in certain embodiments, the router may be configured to direct the network traffic from the client application to a first internal cloud node of the set of cloud nodes. The router may be configured to encrypt the network traffic in multiple layers of encryption before sending it to the first internal cloud node. The encryption may be one of a number of different types. For example, in certain embodiments, the encryption can include symmetric key encryption and public key encryption. More specifically, in certain embodiments, the encryption can include transport layer security and secure sockets layer cryptographic protocols. In certain embodiments, the client application may be active on a virtual machine of an internal cloud node of the set of cloud nodes. In certain embodiments, the client application may be active on a computer workstation external to the cloud environment.

Consistent with various embodiments, the first internal cloud node of the set of cloud nodes may be configured to decrypt the first layer of encryption of the network traffic. In certain embodiments, decrypting the first layer of encryption may provide the first internal cloud node with instructions to send the network traffic to another internal cloud node (e.g., a second internal cloud node) of the cloud environment. In this way, the network traffic may be sent to a number of successive internal cloud nodes. In certain embodiments, the number of internal cloud nodes to send the network traffic to may be determined by the router prior to sending the network traffic to the first internal cloud node. In certain embodiments, the number of internal cloud nodes to send the network traffic to can be determined randomly, depending on the number of available internal cloud nodes in the cloud environment (e.g., a random number of nodes between 1 and 11 available internal cloud nodes).

Aspects of the present disclosure, in certain embodiments, are directed toward providing a cloud management interface configured to manage a set of anonymity preferences of the router. The anonymity preferences of the router may include a variety of options that a user may select to configure the desired anonymity level for the network traffic. As an example, in certain embodiments, the anonymity preferences may include source anonymity and destination anonymity. Accordingly, the router could be configured to obfuscate (e.g., encrypt) the network traffic such that the source of the network traffic, the destination of the network traffic, or both are hidden. In certain embodiments, the anonymity preferences may include enabling obfuscation based on the client application, or the virtual machine in use. Further, as an example, the anonymity preferences may include allowing a user to select a source such as a particular application, port, server, domain, IP address, or virtual machine and/or a destination (e.g., a particular IP address, domain) for which network traffic should be obfuscated. Accordingly, the router could be configured to obfuscate the network traffic based on the client application, virtual machine, or both. Other types of anonymity preferences are also possible. In certain embodiments, the anonymity preferences may be provided as a service to a user. In certain embodiments, the service may be provided freely to the user, or at a cost to the user.

Consistent with various embodiments, at block 510 the method 500 can include routing the network traffic to a destination identified by the client application. The destination may be a particular IP address or other network location within the cloud environment. In certain embodiments, the destination may be designated by a user of the client application. For example, the user may specify a specific individual or location in the network where the network traffic should be sent. Accordingly, after the network traffic has been routed through one or more internal cloud nodes (e.g., Tor nodes), the final node may be configured to decrypt the final layer of encryption of the network traffic. Upon decrypting the final layer, the final node may receive instructions to transmit the network traffic to the destination designated by the user of the client application. In certain embodiments, each node of the internal cloud nodes may be unaware of the number of nodes in the network, as well as whether the network traffic was received from the source or will be transmitted directly to the destination.

Consider the following example. In certain embodiments, the set of internal cloud nodes may belong to a proprietary cloud environment of a hospital. The network traffic may include confidential patient healthcare records and information that should not be shared with unauthorized individuals. In certain embodiments, the confidential patient information may be stored on a storage device of the cloud environment of the hospital. A nurse (e.g., an authorized individual) may desire to send the confidential patient information to a doctor (e.g., an authorized individual) to get a second opinion regarding the best treatment plain for a particular patient. In certain embodiments, it may be desirable to keep the identity of the nurse and the doctor unknown to other unauthorized individuals. Accordingly, the nurse may designate the doctor as the destination, and send the confidential patient information over the cloud environment. As described herein, a router may receive the confidential patient information, and encrypt it with several layers of encryption before transmitting it to a first internal cloud node. The first internal cloud node may decrypt the first layer of encryption, and send the confidential patient information to a second internal cloud node based on instructions included with the confidential information below the first layer of encryption. The confidential patient information may be sent to a number of internal cloud nodes in this manner before being sent to the doctor (e.g., the destination). In this way, both the source and destination of the confidential information can remain anonymous.

Figure 6:
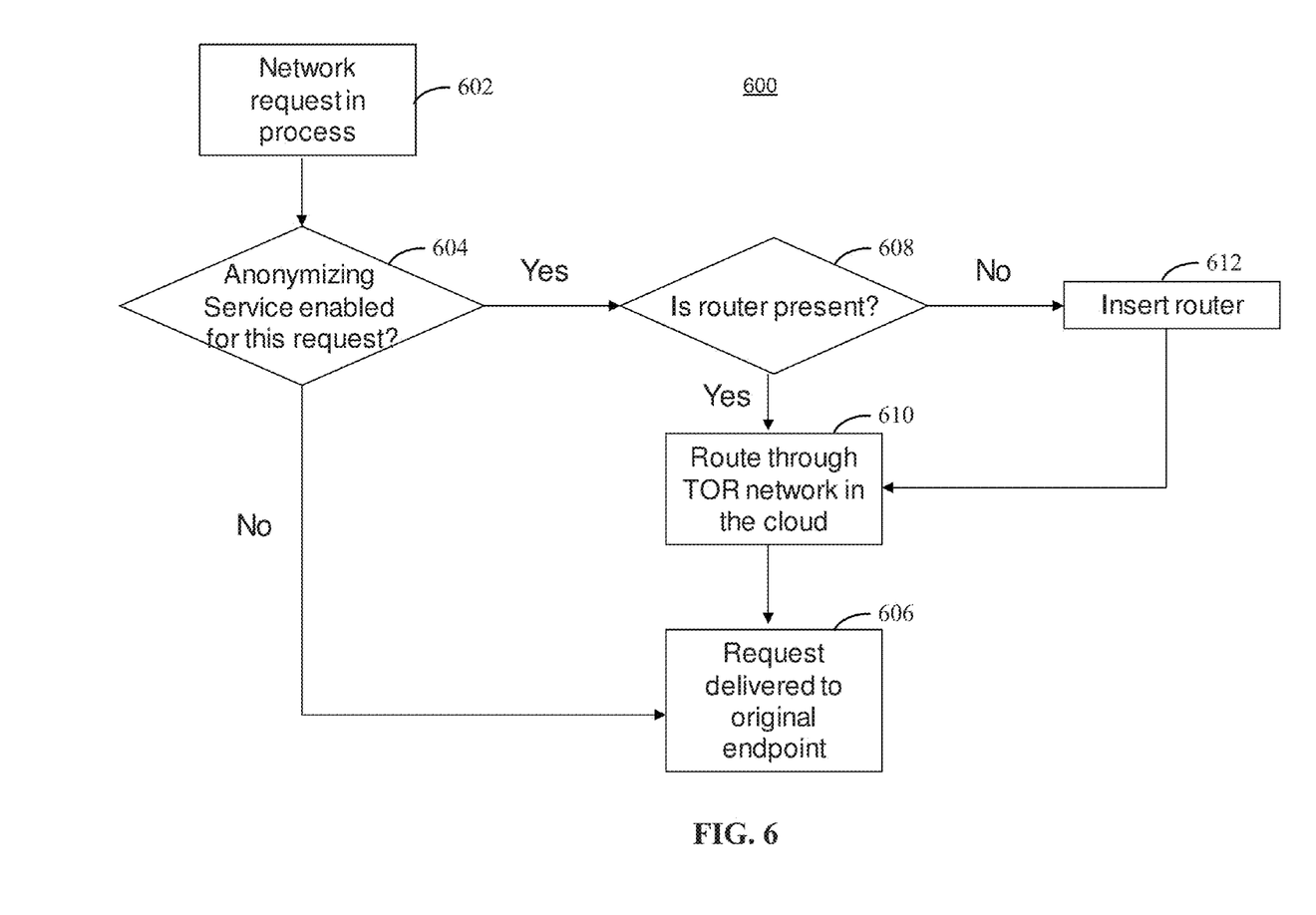
FIG. 6 is a flowchart illustrating a method for cloud-based traffic anonymization, according to embodiments.

FIG. 6 is a flowchart illustrating a method 600 for cloud-based traffic anonymization, consistent with embodiments of the present disclosure. Aspects of FIG. 6 are directed toward anonymizing (e.g., obfuscating) network traffic using a router configured to direct the network traffic through a network of internal cloud nodes (e.g., Tor nodes) in a cloud environment.

Consistent with various embodiments, at block 602 the method 600 can include processing a network request. The network request may include a request from a client application to transmit network traffic (e.g., data packets) through a cloud environment to an endpoint (e.g., destination). In certain embodiments, the network request may, for example, include email, instant messaging, search queries, web page loads, or other type of communication between a client application and the cloud environment. The network request may be sent from the client application and received by an application server of the cloud environment. At block 604, the method 600 can include determining whether or not anonymizing service has been enabled for the network request. As described herein, the anonymizing service may be provided to users with configurable anonymity preferences (e.g., source anonymity, destination anonymity, virtual machine anonymity, client application anonymity, etc.). In certain embodiments, the user of the client application may be able to select whether or not an anonymity service is desirable for a particular network request (e.g., via a dialog box of the client application, etc.). In the event that anonymizing service is not enabled for a particular network request, at block 610 the network traffic may be directly routed to the endpoint designated by the user.

In the event that anonymizing service is requested for a particular network request, at block 608 the method 600 can include determining whether or not a router is present. In certain embodiments, the router may be a hardware router. In certain embodiments, the router may be a software router. If a router is present, the method may proceed to block 610. If a router is not present, at block 612 the method 600 can include inserting a router configured to direct the network traffic through one or more internal cloud nodes (e.g., Tor nodes) of the cloud environment. At block 610, the method 600 can include routing the network traffic to a first internal cloud node of the cloud environment. In certain embodiments, the method 600 may include using an anonymity algorithm configured to assign random IP addresses to each internal cloud node of the set of cloud nodes, and then routing the network traffic to a random node of the set of internal cloud nodes. The router may also be configured to encrypt the network traffic with multiple layers of encryption. As the network traffic is sent to multiple internal cloud nodes, each node may be configured to decrypt a layer of the encryption to reveal instructions to send the network traffic to the next node. At block 606, the network traffic may be delivered to the original endpoint designated by the user of the client application.

Consider the following example. In certain embodiments, the set of internal cloud nodes may belong to a propriety cloud environment of a bank. The network traffic may include confidential client financial records and information that should not be shared with unauthorized individuals. In certain embodiments, the confidential financial information may be stored on a storage device of the cloud environment of the bank. A banker (e.g., an authorized individual) may desire to send the confidential financial information to a financial analyst (e.g., an authorized individual) to get advice regarding the best savings plan for a particular client. In certain embodiments, it may be desirable to keep the identity of the banker and the financial analyst unknown to other unauthorized individuals. Accordingly, the banker may designate the financial analyst as the destination, and send the confidential financial information over the cloud environment. As described herein, a router may receive the confidential financial information, and encrypt it with several layers of encryption before transmitting it to a first internal cloud node. The first internal cloud node may decrypt the first layer of encryption, and send the confidential financial information to a second internal cloud node based on instructions included with the confidential financial information below the first layer of encryption. The confidential financial information may be sent to a number of internal cloud nodes in this manner before being sent to the financial analyst (e.g., the destination). In this way, both the source and destination of the confidential financial information can remain anonymous.

Figure 7:
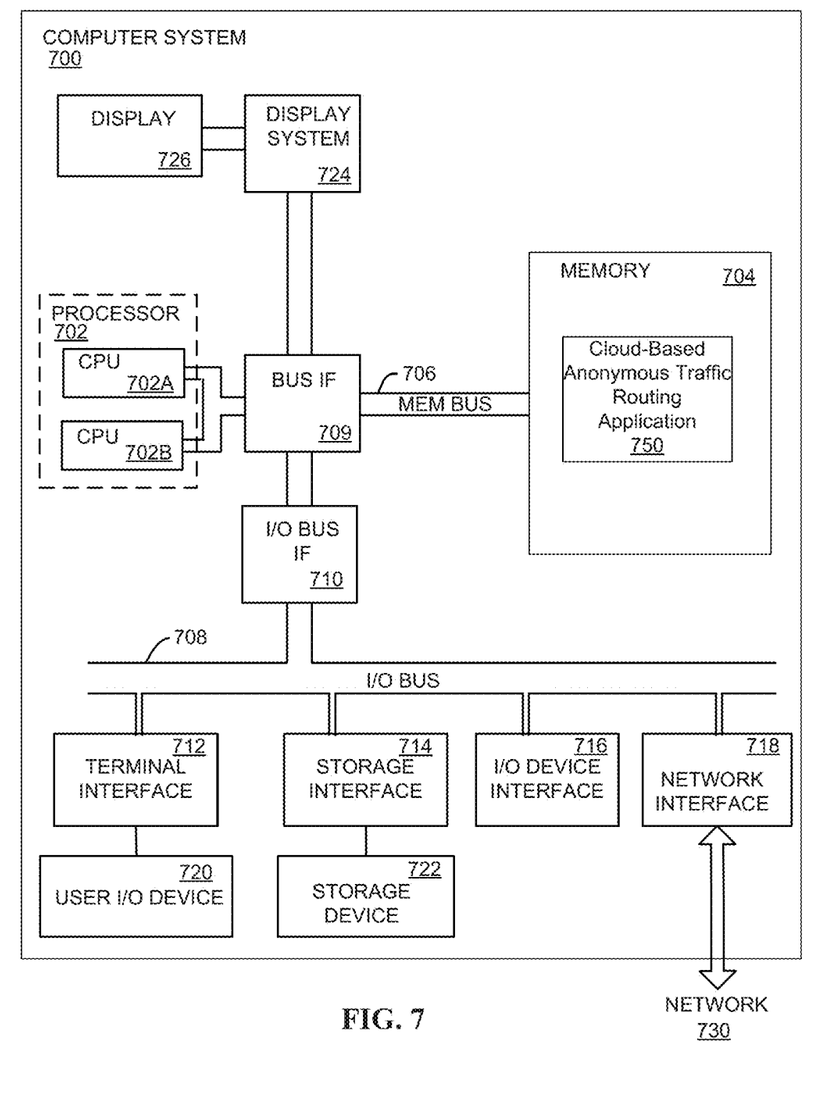
FIG. 7 depicts a high-level block diagram of a computer system for implementing various embodiments; according to embodiments.

FIG. 7 depicts a high-level block diagram of a computer system 700 for implementing various embodiments. The mechanisms and apparatus of the various embodiments disclosed herein apply equally to any appropriate computing system. The major components of the computer system 700 include one or more processors 702, a memory 704, a terminal interface 712, a storage interface 714, an I/O (Input/Output) device interface 716, and a network interface 718, all of which are communicatively coupled, directly or indirectly, for inter-component communication via a memory bus 706, an I/O bus 708, bus interface unit 709, and an I/O bus interface unit 710.

The computer system 700 may contain one or more general-purpose programmable central processing units (CPUs) 702A and 702B, herein generically referred to as the processor 702. In embodiments, the computer system 700 may contain multiple processors; however, in certain embodiments, the computer system 700 may alternatively be a single CPU system. Each processor 702 executes instructions stored in the memory 704 and may include one or more levels of on-board cache.

In embodiments, the memory 704 may include a random-access semiconductor memory, storage device, or storage medium (either volatile or non-volatile) for storing or encoding data and programs. In certain embodiments, the memory 704 represents the entire virtual memory of the computer system 700, and may also include the virtual memory of other computer systems coupled to the computer system 700 or connected via a network. The memory 704 can be conceptually viewed as a single monolithic entity, but in other embodiments the memory 704 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 704 may store all or a portion of the various programs, modules and data structures for processing data transfers as discussed herein. For instance, the memory 704 can store a cloud-based anonymous traffic routing application 750. In embodiments, the cloud-based anonymous traffic routing application 750 may include instructions or statements that execute on the processor 702 or instructions or statements that are interpreted by instructions or statements that execute on the processor 702 to carry out the functions as further described below. In certain embodiments, the cloud-based anonymous traffic routing application 750 is implemented in hardware via semiconductor devices, chips, logical gates, circuits, circuit cards, and/or other physical hardware devices in lieu of, or in addition to, a processor-based system. In embodiments, the cloud-based anonymous traffic routing application 750 may include data in addition to instructions or statements.

The computer system 700 may include a bus interface unit 709 to handle communications among the processor 702, the memory 704, a display system 724, and the I/O bus interface unit 710. The I/O bus interface unit 710 may be coupled with the I/O bus 708 for transferring data to and from the various I/O units. The I/O bus interface unit 710 communicates with multiple I/O interface units 712, 714, 716, and 718, which are also known as I/O processors (IOPs) or I/O adapters (IOAs), through the I/O bus 708. The display system 724 may include a display controller, a display memory, or both. The display controller may provide video, audio, or both types of data to a display device 726. The display memory may be a dedicated memory for buffering video data. The display system 724 may be coupled with a display device 726, such as a standalone display screen, computer monitor, television, or a tablet or handheld device display. In one embodiment, the display device 726 may include one or more speakers for rendering audio. Alternatively, one or more speakers for rendering audio may be coupled with an I/O interface unit. In alternate embodiments, one or more of the functions provided by the display system 724 may be on board an integrated circuit that also includes the processor 702. In addition, one or more of the functions provided by the bus interface unit 709 may be on board an integrated circuit that also includes the processor 702.

The I/O interface units support communication with a variety of storage and I/O devices. For example, the terminal interface unit 712 supports the attachment of one or more user I/O devices 720, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 720 and the computer system 700, and may receive output data via the user output devices. For example, a user interface may be presented via the user I/O device 720, such as displayed on a display device, played via a speaker, or printed via a printer.

The storage interface 714 supports the attachment of one or more disk drives or direct access storage devices 722 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 722 may be implemented via any type of secondary storage device. The contents of the memory 704, or any portion thereof, may be stored to and retrieved from the storage device 722 as needed. The I/O device interface 716 provides an interface to any of various other I/O devices or devices of other types, such as printers or fax machines. The network interface 718 provides one or more communication paths from the computer system 700 to other digital devices and computer systems; these communication paths may include, e.g., one or more networks 730.

Although the computer system 700 shown in FIG. 7 illustrates a particular bus structure providing a direct communication path among the processors 702, the memory 704, the bus interface 709, the display system 724, and the I/O bus interface unit 710, in alternative embodiments the computer system 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 710 and the I/O bus 708 are shown as single respective units, the computer system 700 may, in fact, contain multiple I/O bus interface units 710 and/or multiple I/O buses 708. While multiple I/O interface units are shown, which separate the I/O bus 708 from various communications paths running to the various I/O devices, in other embodiments, some or all of the I/O devices are connected directly to one or more system I/O buses.

In various embodiments, the computer system 700 is a multi-user mainframe computer system, a single-user system, or a server computer or similar device that has little or no direct user interface, but receives requests from other computer systems (clients). In other embodiments, the computer system 700 may be implemented as a desktop computer, portable computer, laptop or notebook computer, tablet computer, pocket computer, telephone, smart phone, or any other suitable type of electronic device.

FIG. 7 depicts several major components of the computer system 700. Individual components, however, may have greater complexity than represented in FIG. 7, components other than or in addition to those shown in FIG. 7 may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for cloud-based anonymous traffic routing, the method comprising:
   processing a network request received by an application server of a cloud environment from a client application, the network request including a request from the client application to transmit network traffic through a cloud environment to a destination endpoint;
   determining with the application server that anonymizing service is enabled for the received network request;
   in response to determining that the anonymizing service is enabled for the received network request, the method further comprises:
   inserting a router into the cloud environment, the router configured to encrypt the network traffic of the network request with multiple layers of encryption;
   receiving, from the client application by the inserted router, network traffic identified for the destination endpoint;
   determining, for a set of internal cloud nodes distinct from both the client application and the destination endpoint, a set of internet protocol (IP) addresses including a first IP address for a random first internal cloud node of the set of internal cloud nodes;
   establishing an anonymity algorithm for cloud-based anonymous traffic routing, the anonymity algorithm configured to use the set of IP addresses;
   routing, based on the anonymity algorithm, the network traffic from the inserted router to the random first internal cloud node using the first IP address; and
   routing the network traffic from the set of internal cloud nodes to the destination endpoint identified by the client application, wherein each internal cloud node of the set of internal cloud nodes is configured to decrypt a layer of the encryption to reveal instructions to send the network traffic to a next internal cloud node such that the network traffic is sent to a plurality of internal cloud nodes before being delivered to the destination endpoint designated by the network request.

2. The method of claim 1, further comprising routing, based on the anonymity algorithm utilizing the set of IP addresses, using the router, the network traffic to a second internal cloud node of the set of internal cloud nodes using a second IP address of the set of IP addresses.

3. The method of claim 1, further comprising transmitting, via the router, a set of data packets of the received network traffic to the random first internal cloud node in a predetermined time interval in an order that is random with respect to the order in which the set of data packets were received.

4. The method of claim 1, wherein determining that anonymizing service is enabled for the received network request includes receiving a user selection indicating that the anonymizing service is desired for the received network request.

5. The method of claim 1, further comprising determining, by the application server, that anonymizing service is enabled for the received network request based on an origin of the network traffic and the endpoint designated in the network request.

6. The method of claim 1, wherein each of the internal cloud nodes is a TOR (The Onion Router) node.

7. The method of claim 1, further comprising assigning a respective random IP address to each of the set of internal cloud nodes.

8. The method of claim 7, further comprising:
   assigning a respective temporal validity value for each random IP address assigned to a respective internal cloud node of the set of internal cloud nodes, the respective temporal validity value specifying a period of time during which each random IP address is valid; and
   reassigning a respective random IP address to the respective internal cloud node when the respective temporal validity value expires.

9. A system for cloud-based anonymous traffic routing, the system comprising:
   an application server comprising a processor configured to process a network request received from a client application, the network request including a request from the client application to transmit network traffic through a cloud environment to a destination endpoint designated by the network request;
   a router comprising a processor configured to encrypt the network traffic of the network request with multiple layers of encryption; and
   a set of internal cloud nodes distinct from both the client application and the destination endpoint;
   wherein the processor in the application server is configured to determine that anonymizing service is enabled for the received network request;
   wherein the processor in the application server is configured to direct the network traffic to the router in response to determining that the anonymizing service is enabled for the network request;
   wherein the processor in the router is configured to:
      receive, from the client application, network traffic identified for the destination endpoint;
      determine, for the set of internal cloud nodes, a set of internet protocol (IP) addresses including a first IP address for a random first internal cloud node of the set of internal cloud nodes;
      establish an anonymity algorithm for cloud-based anonymous traffic routing, the anonymity algorithm configured to use the set of IP addresses;
      route the network traffic to the random first internal cloud node of the set of internal cloud nodes using the first IP address and based on the anonymity algorithm;
   wherein the set of internal cloud nodes each comprise a respective processor configured to route the network traffic from the set of internal cloud nodes to the destination endpoint identified by the client application, wherein the respective processor of each internal cloud node of the set of internal cloud nodes is configured to decrypt a layer of the encryption to reveal instructions to send the network traffic to a next internal cloud node such that the network traffic is sent to a plurality of internal cloud nodes before being delivered to the destination endpoint designated by the network request.

10. The system of claim 9, wherein the processor in the application server is configured determine that anonymizing service is enabled for the received network request based on receiving a user selection indicating that the anonymizing service is desired for the received network request.

11. The system of claim 9, wherein the processor in the application server is configured to determine that anonymizing service is enabled for the received network request based on an origin of the network traffic and the endpoint designated in the network request.

12. The system of claim 9, wherein each of the internal cloud nodes is a TOR (The Onion Router) node.

13. The system of claim 9, wherein the processor in the router is configured to assign a respective random IP address to each of the set of internal cloud nodes.

14. The system of claim 13, wherein the processor in the router is further configured to:
- assign a respective temporal validity value for each random IP address assigned to a respective internal cloud node of the set of internal cloud nodes, the respective temporal validity value specifying a period of time during which each random IP address is valid; and
- reassign a respective random IP address to the respective internal cloud node when the respective temporal validity value expires.

* * * * *